United States Patent Office 3,098,846
Patented July 23, 1963

3,098,846
VAPOR PHASE POLYMERIZATION WITH SOLID SOLVENT COATED CATALYST
John W. Eldridge, Charlottesville, and Charles R. Outterson, Richmond, Va., assignors to Albemarle Paper Manufacturing Company, Richmond, Va., a corporation of Virginia
No Drawing. Filed Nov. 20, 1959, Ser. No. 854,251
10 Claims. (Cl. 260—94.9)

This invention relates to the production of polymers of normally gaseous olefinic hydrocarbons such as ethylene, propylene and the like. More particularly, it relates to a polymerization process wherein gaseous monomer is brought into physical contact with suitably prepared solid catalyst material and in which freshly formed polymer is removed from the catalytic surfaces present in the reaction zone as soon as the polymer forms or shortly thereafter, in order that the acivity of such surfaces is maintained unimpaired.

A major object is to provide a novel and improved process for polymerizing polymerizable materials to normally semi-solid and solid polymers by use of solid-phase catalysts.

Another object is to provide novel forms of solid polymerization catalysts.

Another object is to provide novel means of removing normally semi-solid or solid polymers from the solid polymerization catalysts on which they are polymerized.

Another object is to provide, by use of the aforesaid novel forms of solid catalysts and novel means of removing polymers from these catalysts, a practical and economical process for direct polymerization yielding semi-solid or solid polymers on solid catalysts.

It is a further object to provide a polymerization process which makes possible marked economies in both initial investment and operating costs, relative to present commercial practice, for conventional plants to produce such polymers.

It is a still further object to provide a polymerization process which makes possible elimination of some of the major technical problems, process steps, and process equipment inherent in present commercial plants for producing such polymers.

Still another object is to provide a simple and improved process for the polymerization of ethylene.

In the description which follows, ethylene is employed as illustrative of the preferred monomer to be polymerized, but it is to be understood that the invention is also applicable to propylene and other similar olefinic hydrocarbons.

Briefly, the invention provides a simplified process wherein the advantages of gas phase polymerization are retained and the additional expense and inconvenience of slurry polymerization are avoided, by a novel procedure involving pretreatment of the solid catalyst by applying a thin film of solvent liquid to the catalytic surfaces prior to the introduction of unpolymerized ethylene into contact with said surfaces; the solvent liquid being one in which freshly formed polymer dissolves and is thereby removed from the catalytic surfaces, and the application of said liquid being repeated as necessary to maintain the removal of polymer at a sufficient rate to prevent building up of any thick solid coatings on the catalyst.

It is well known that the polymerization of ethylene and other similar olefines often produces solid resinous polymer products which are so strongly adherent to the surface of solid catalyst materials that their recovery presents a major problem.

One attempted solution to the problem lies in the use of gaseous catalysts such as $BF_3$ but those heretofore developed have been expensive and must be recovered if the process is to remain economically attractive. Consequently major efforts have been directed in the commercial polymerization processes, to the use of solid catalysts.

With solid catalysts, pretreatments with materials intended to decrease adherence to the polymer deposit and similar conditioning procedures have been found to afford only temporary benefits, and in practice a rapid building up of solid polymer on the surface of the catalyst has been experienced, with attendant slowing down of the rate of the polymerization reaction as the thickness of the polymer coating on the catalyst surfaces increases.

Accordingly one of the more popular approaches has been to provide the polymerization system with a liquid medium which serves as both the reaction medium and as a solvent for the polymer product, whereby the catalyst is constantly available. Unfortunately the rate of progress of the polymerization reaction is several orders of magnitude slower in the liquid phase than it is in the vapor phase partly because of the relatively low solubility of ethylene in the liquid reaction medium and for other inherently reaction-retarding reasons.

By the present invention these and other disadvantages of liquid polymerization procedures are avoided and the advantageous high rate of reaction characteristic of gas polymerizations is retained.

For use in the examples which follow, a polymerization catalyst was prepared with pellets of ⅛ inch x ⅛ inch size of a standard silica-alumina (87:13) petroleum cracking catalyst support, commercially available from the Davison Chemical Company and others. The pellets were soaked for up to about four hours in an aqueous solution of ammonium dichromate with occasional stirring to promote uniformity in the product. The soaking was carried out preferably with the solution at about 60° C., but temperatures of 25° C. to 80° C. have also been used. Preferably the solution is one which is saturated at room temperature, but concentrations of between 0.1 molar and 2 molar have been found satisfactory. The pH of the impregnating bath should be between 1.5 and 4. After thorough impregnation, the pellets were withdrawn and the solution was permitted to drain from the pellets before they were charged into an oven. The pellets were heated in air in an oven at 105° C. and after they were thoroughly dry, they were activated by firing at between 350° C. and 600° C. for about 3 hours. As a result, a mixture of tri- and hexavalent oxides of chromium was deposited on the surface of the pellets.

It should be noted that any of a large number of known polymerization catalysts which are solids may be substituted for the preferred solids prepared as above described without departing from the invention. Suitable solid catalysts are described in U.S. Patents 2,692,257; 2,606,940; 2,828,347; 2,825,721; and 2,470,166 to mention but a few of those known.

*Example 1*

Thirty grams of activated catalyst pellets, prepared as above described, were charged into an aluminum wire basket. The basket was suspended in a steel cup 3½ inches I.D., 4 inches deep and having a wall thickness of ½ inch. The capacity of this pressure vessel was one pint.

The vessel was sealed with a flanged lid, bolted to the cup, and then immersed in an oil bath. The lid was provided with the usual valved connections serving to connect the vessel and its contents to vacuum or to sources of selected fluids, in a manner well known and understood. The oil bath was maintained at about 150° C. while potential catalyst poisons and other undesirable gases were desorbed from the pellets by connecting the pressure vessel to a 200 micron vacuum for thirty minutes. The desorption could be carried out at other temperatures provided that the temperature is not permitted to rise to an extent at which the catalytic activity of the catalyst would be destroyed. Desorption at temperatures below 150° C. was found to be somewhat slower and therefore 150° C. is preferred as a working temperature.

While the catalyst pellets were being desorbed a body of paraffin oil was being subjected to a vacuum treatment in a flask, to effect removal of water and dissolved air from the paraffin oil. The paraffin oil was a clear waterwhite liquid mineral oil commercially available as "paraffin oil" and comprising a mixture of saturated aliphatic hydrocarbons wherein the chain contains at least 15 carbon atoms. The paraffin oil was heated to 150° C. while a vacuum was actively pumped on the flask containing it.

When both the desorption of the catalyst and the dehydration of the paraffin oil had been completed, the paraffin oil was admitted to the pressure vessel, while maintaining the vacuum thereon. About 300 cc. of heated (150° C.) paraffin oil were added while the vessel was under vacuum. Then the connection to the vacuum pump was closed and a cylinder of pure medical-grade ethylene gas was connected to the reaction vessel under a pressure of 150 p.s.i. gauge, while the catalyst pellets were submerged in the liquid paraffin oil. The aluminum wire basket and its contents were then raised out of the body of liquid paraffin oil and into the ethylene gas contained in the space above the liquid. The catalyst pellets were thereby provided with a thin film of paraffin oil of a thickness limited by the adherence of the solvent to the surface of the catalyst, through which the ethylene gas passed more or less freely into contact with the surface of the activated solid catalyst. At the existing temperature and pressure, some ethylene is polymerized and the resulting polymeric material being soluble in the paraffin oil film dissolves therein, and tends to drain from the solid leaving on the catalyst surfaces a thin residual film of paraffin oil containing some amounts of polymer. In this manner the solid catalyst surfaces remain readily available for participation in the polymerization of ethylene.

To prevent build-up of polymer in the film carried on the catalyst particles, the wire basket was lowered from time to time, to flush the film of paraffin oil containing polymer from the particles and to refilm the particles with a fresh film of paraffin oil containing very little polymer. A cycle of 15 minutes in the vapor space followed by one minute of vigorous up and down movement in the liquid was repeated over a period of three hours, after which the supply of ethylene was removed, and the pressure gradually relieved in the vessel.

The reaction vessel was opened and the catalyst pellets in their wire basket were separated from the body of hot liquid. The hot liquid was permitted to cool and on cooling from the reaction temperature to room temperature, the separation of solid polyethylene was found to begin at about 200° C. On further cooling, solid polyethylene having a melting point of about 122° C. separated from the liquid phase as a solid while remaining dispersed throughout the paraffin oil.

At room temperature (25° C.) the final product was a solid mass having the physical consistency of a grease or wax and comprising a solid, wax-like dispersion of polyethylene in paraffin oil, the dispersion having physical characteristics dependent to some extent on the rate of cooling, amount of agitation during cooling, relative proportions of polyethylene and paraffin oil and other similar variables.

The resulting composition, which set up as a hard solid, is useful as a coating for kraft paper, to which it may be applied by spraying the remelted composition. It may also be used where similar blends of polyethylene and waxes are presently being employed.

*Example 2*

Instead of flushing the catalyst in the same body of heated liquid paraffin oil, the procedure of Example 1 was repeated with the following changes: About 200 cc. of vacuum dehydrated hot paraffin oil was admitted into the cup containing the desorbed catalyst. Ethylene gas under pressure was introduced as before. The solid catalyst particles, filmed with the hot paraffin oil, were raised into the vapor space, polymerization took place for 30 minutes, during which the catalyst particles were periodically dunked in the hot liquid, to wash off the polymer. The hot, liquid, polyethylene-containing paraffin oil was withdrawn, a freshly evacuated 200 cc. portion of hot paraffin oil was introduced into the reaction vessel and the process was repeated five (5) times. Since the hot liquids did not contain as much polymer as in Example 1, they did not set into a hard solid at room temperature, but set up as a thin grease or barely pourable heavy oil.

The melting point of the polyethylene obtained after separation from the paraffin oil was found to be the same as in Example 1, namely between 120° C. and 125° C. for each of the five (5) runs.

Separation was accomplished both by settling and by the use of hexane, xylene and other suitable diluents to lower the viscosity of the paraffin oil liquid phase sufficiently to permit rapid separation of the polyethylene at temperatures below the melting point of the polymer.

While in the above examples a batch procedure has been disclosed it is to be understood that in many instances it may be preferable to conduct the process as a continuous process, e.g. by introducing heated liquid paraffin oil or other suitable solvent for the freshly formed polymer into contact with the solid catalyst surfaces to continuously provide a filmed solid surface for contact with the ethylene to be polymerized and means for flushing the freshly formed polymer from the surface and to refilm the surface for a repetition of the process.

Similarly while the process has been found to be particularly advantageous for the preparation of polymers of ethylene, having melting points between 120° C. and 125° C., it will be apparent that the process could be conducted to produce other specific polymers of ethylene by altering the catalyst, pressure, temperature or other controllable variable in the process and that the procedure is applicable to other polymerization processes, e.g. those involving other olefines.

Furthermore it should be noted that the separation of the polymer from the liquid may be varied to some extent according to the liquid used. For example with relatively low molecular weight liquids, the solvent is preferably separated from the polymer by distillation or evaporation, while with relatively high molecular weight liquids, the solvent, if separated, is preferably separated by cooling and crystallization.

In the manner described above, ethylene has been polymerized operating at temperatures between about 110° C. and 205° C. and at pressures in the reaction vessel ranging from subatmospheric to 600 p.s.i. gauge.

While the invention has been described with specific reference to the polymerization of ethylene, it is equally applicable to such monomers, usable singly or in combination, as the normal and branched 1-olefin, especially those containing from 2 to 8 carbon atoms, inclusive, such as ethylene, propylene, the butylenes, etc.; the diolefins and polyolefins, especially those with unsaturation in the 1-position, such as butadiene, isoprene, and chloroprene; cyclic olefins, such as cyclohexene; aryl olefins, such as styrene and alkyl-substituted styrenes; other compounds containing an active $CH_2=C<$ group, such as acrylonitrile, methylacrylonitrile, methacrylate, methyl methacrylate, vinyl acetate, vinyl chloride, the vinyl pyridines, etc. The foregoing monomers are offered merely as examples and are not intended to constitute an allinclusive list or imply any restrictions on the type of monomer which may be employed within the scope of this invention.

We claim:

1. In a polymerization process wherein solid polymer is formed when a polymerizable gaseous monomer is brought into physical contact with the surface of particles of a solid polymerization catalyst, supported in a solely vapor-containing polymerization zone; the improvement which comprises coating the surface of said particle with a thin film of solvent for said polymer prior to polymerization maintaining the catalytic activity of the surfaces of said catalyst particles by flushing the freshly formed polymer from the surfaces of said particles with said solvent for said polymer and reintroducing the flushed catalyst particles, bearing a thin film of said solvent, into the solely vapor containing polymerization zone and repeating the sequence consisting of polymerization of the gaseous monomer and the removal of polymer.

2. The process of claim 1 wherein the steps of filming, polymerizing and flushing are repeated for at least 5 cycles of operation.

3. The process of claim 1 wherein the monomer is an olefine.

4. The process of claim 3 wherein the monomer is ethylene.

5. The process of claim 3 wherein the monomer is propylene.

6. The process of claim 3 wherein the solvent is a mixture of saturated aliphatic hydrocarbons wherein the chain contains at least 15 carbon atoms and the monomer is ethylene.

7. In a polymerization process wherein solid polymer is formed when a polymerizable gaseous monomer is brought into physical contact with the surface of particles of a solid polymerization catalyst, supported in a solely vapor-containing polymerization zone; the improvement which comprises: providing said catalyst particles with a thin superficial film of solvent for said polymer prior to introducing said catalyst particles into said zone containing unpolymerized gaseous monomer; effecting contact between said gaseous monomer and said catalyst particles and thereby causing polymerization of said monomer; and after the deposition of polymer on said catalyst surface produces a substantial decrease in the rate of polymerization, restoring said rate to its original value by flushing the polymer off of the catalyst by means of a solvent for said polymer, and thereafter returning the catalyst while covered by a thin film of said solvent into the zone in which said gaseous monomer is present.

8. The process of claim 7 wherein the film of solvent is of a thickness limited by the adherence of the solvent to the surface of the catalyst.

9. The process of producing a solid polymer by polymerizing a gaseous monomer comprising: contacting the surfaces of particles of a solid polymerization catalyst with a solvent for said polymer, draining said catalyst to form a thin film of solvent on the surfaces of said catalyst, thereafter contacting said particles of catalyst having said film of solvent with said polymerizable gaseous monomer, said gaseous monomer existing solely as a vapor atmosphere, and flushing said polymer from said catalyst particles.

10. The process for producing a solid polymer by polymerizing a gaseous monomer comprising: submerging the surfaces of particles of a solid polymerization catalyst into a solvent for said polymer, raising said polymerization catalyst out of said solvent to drain said catalyst to thereby form a thin film of solvent on the surfaces of said catalyst, contacting said catalyst with a vapor atmosphere containing said polymerizable gaseous monomer, and flushing said polymer from said catalyst particles after polymerization.

References Cited in the file of this patent

UNITED STATES PATENTS

| | | |
|---|---|---|
| 2,825,721 | Hogan et al. | Mar. 4, 1958 |
| 2,829,136 | Fotis et al. | Apr. 1, 1958 |
| 2,888,497 | Pitzer | May 26, 1959 |
| 2,899,414 | Mertes | Aug. 11, 1959 |
| 2,935,495 | Kennedy | May 3, 1960 |